Aug. 23, 1966   C. H. FEHN   3,268,025
MOTORCYCLE HAVING TWO DRIVEN WHEELS
Filed Aug. 20, 1963   5 Sheets-Sheet 1
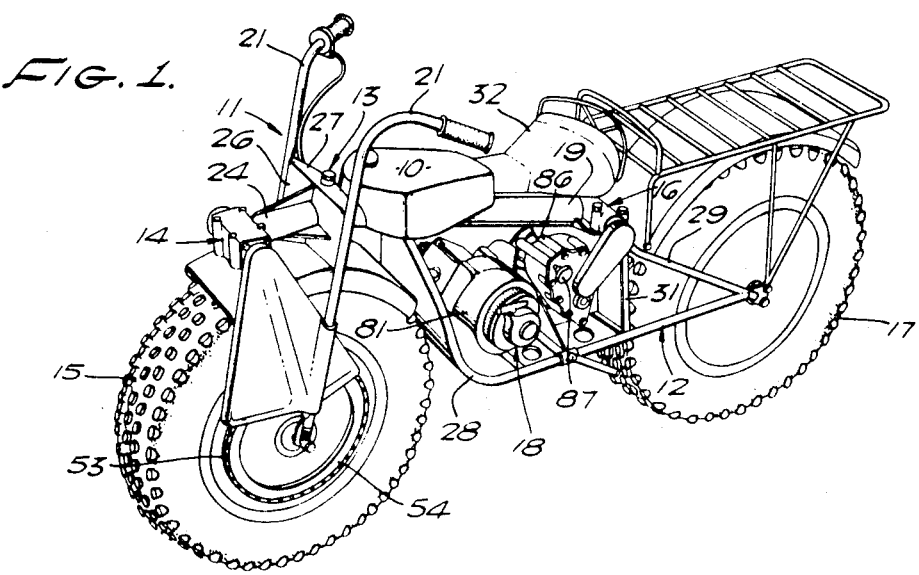
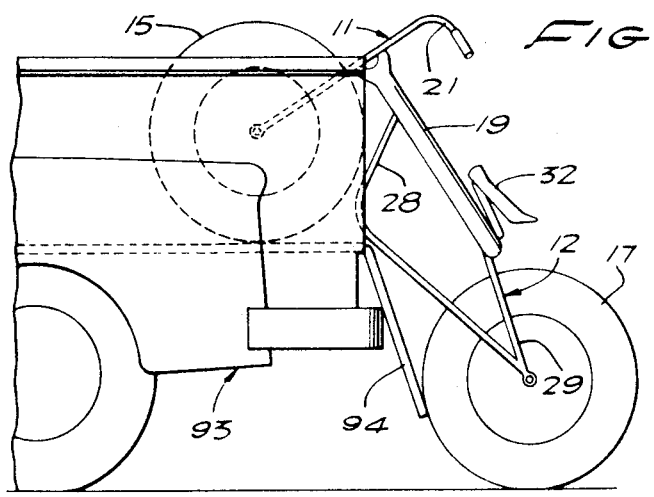
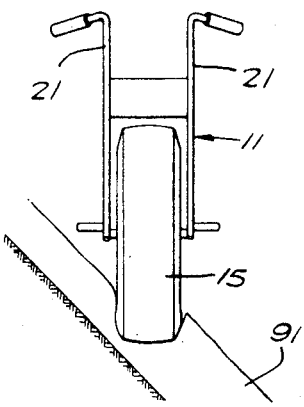
CHARLES H. FEHN
INVENTOR.
KENDRICK AND STOLZY
BY
ATTORNEYS Aug. 23, 1966
C. H. FEHN
3,268,025
MOTORCYCLE HAVING TWO DRIVEN WHEELS
Filed Aug. 20, 1963
5 Sheets-Sheet 2
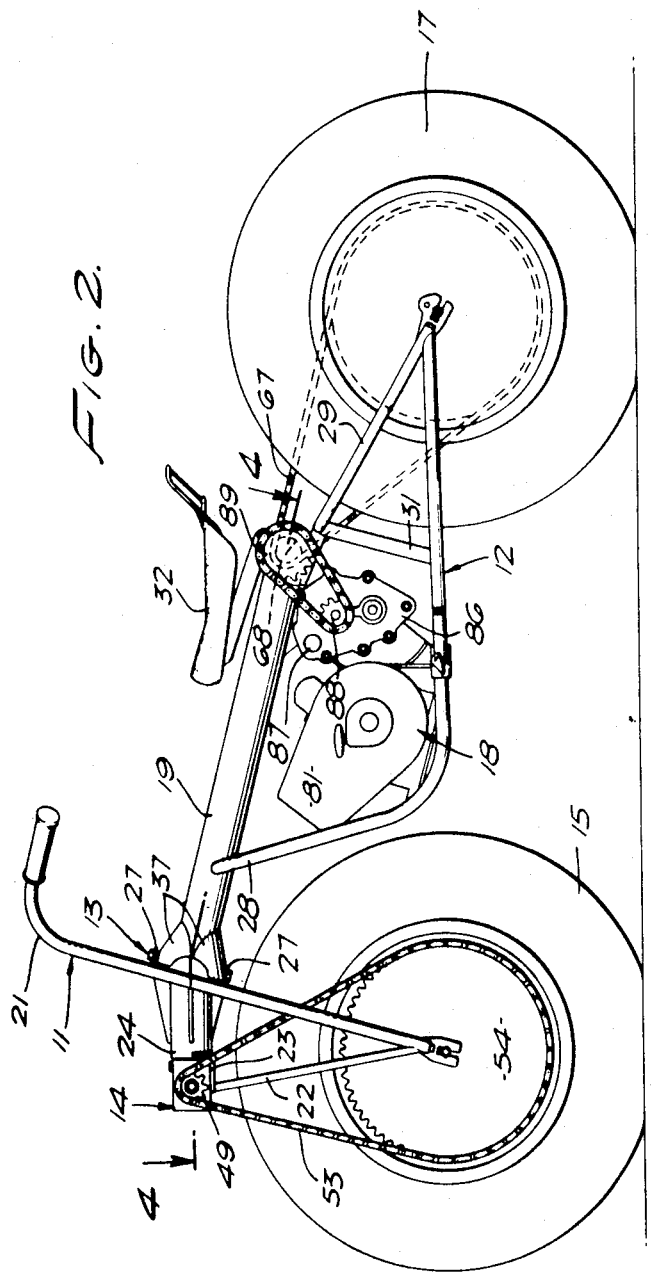
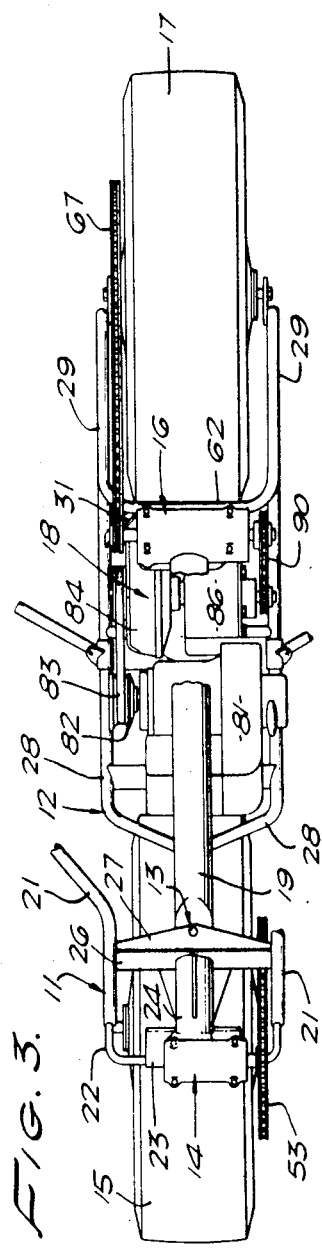
CHARLES H. FEHN
INVENTOR.
KENDRICK AND STOLZY
BY
*A. Donald Stolzy*
ATTORNEYS

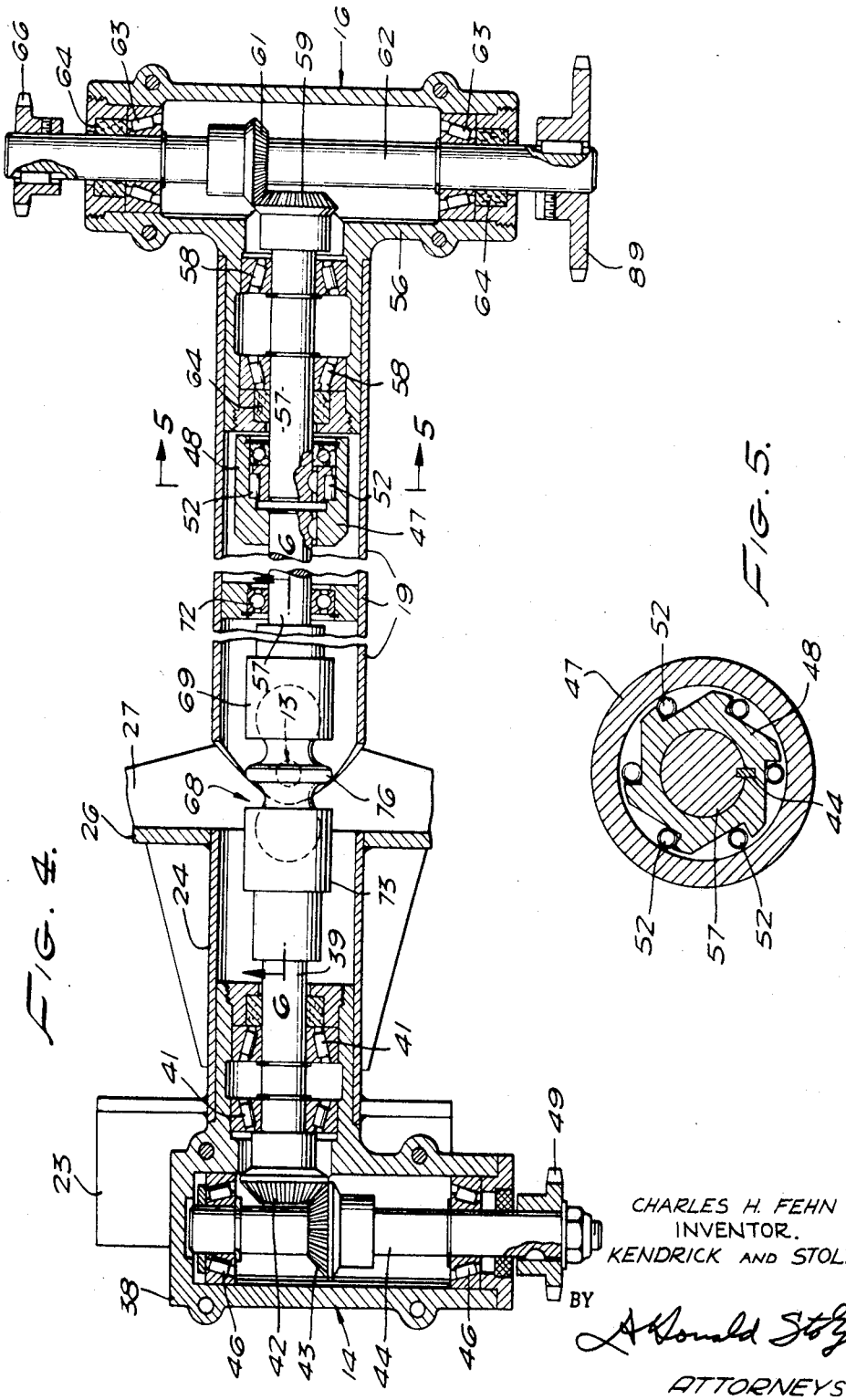

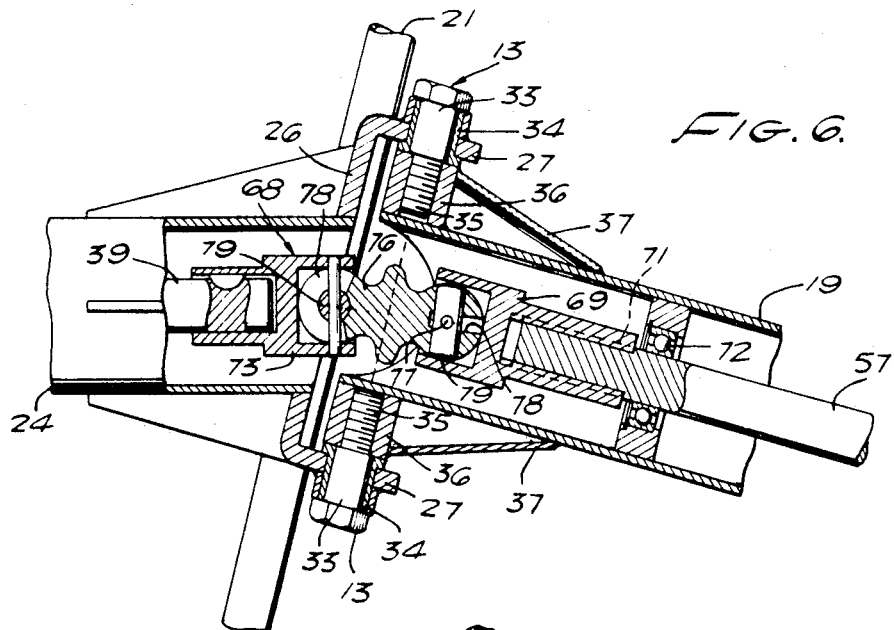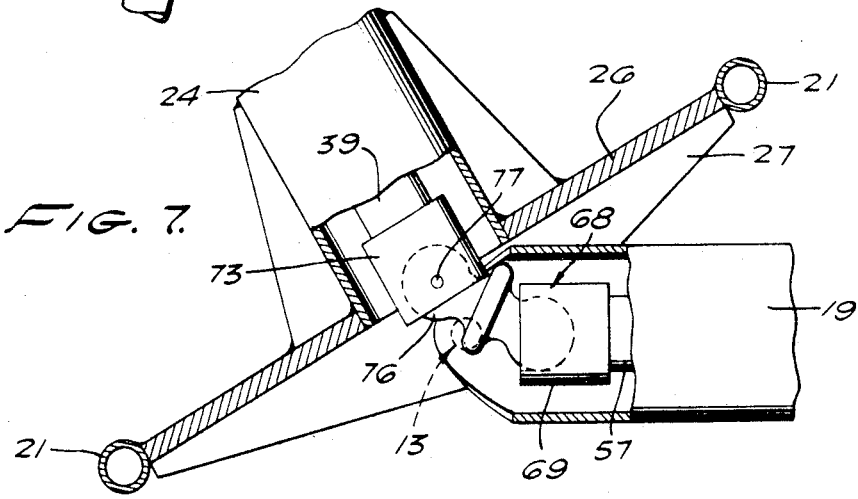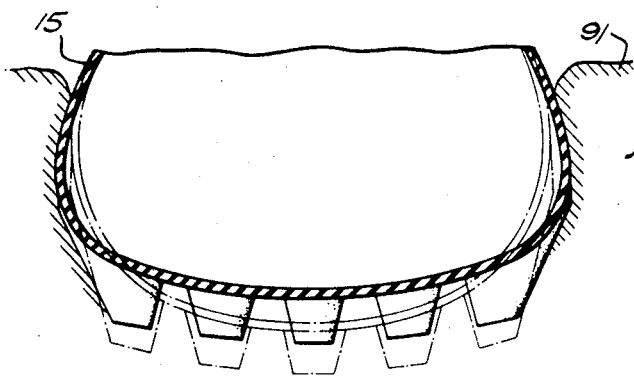

Aug. 23, 1966        C. H. FEHN        3,268,025

MOTORCYCLE HAVING TWO DRIVEN WHEELS

Filed Aug. 20, 1963        5 Sheets-Sheet 5

CHARLES H. FEHN
INVENTOR.

KENDRICK AND STOLZY
BY
ATTORNEYS

United States Patent Office 3,268,025
Patented August 23, 1966

3,268,025
MOTORCYCLE HAVING TWO DRIVEN WHEELS
Charles H. Fehn, Thousand Oaks, Calif., assignor to Nethercutt Industrial Corporation, Sylmar, Calif., a corporation of California
Filed Aug. 20, 1963, Ser. No. 303,357
2 Claims. (Cl. 180—31)

This application is a continuation-in-part of co-pending application Serial No. 806,095, filed April 13, 1959, now abandoned by Charles H. Fehn and co-pending application Serial No. 221,932, filed August 31, 1962, now abandoned by Charles H. Fehn, both entitled Motorcycle for Slow Cross-Country Travel Over Obstructions and in Moutainous Regions, and Over Snow and Soft Ground. The benefit of the filing dates of each of these co-pending applications is hereby claimed for this application.

This invention relates to land vehicles, and more particularly to a motor cycle having a front wheel drive.

Although the present invention may have a large number of applications and should not therefore be limited to the specific use disclosed herein, the invention has been found to have considerable utility when employed in connection with the motorcycles having both a front wheel drive and a rear wheel drive from the same motor.

In the prior art, motorcycles employing two wheel drives have been proposed. However, in the use of these motorcycles, steering has been difficult or impossible. Further, it has been impossible to push such motorcycles manually around a corner without the application of power from a gasoline engine. These types of motorcycles of the prior art also are effectively impossible to ride on a flat surface. A rider may be thrown completely clear of such a vehicle due to a characteristic skid in which the vehicle is placed due to the fact that the front wheel of the vehicle, which is steerable, rotates at a greater rate than that of the rear wheel, when the vehicle is put into a turn.

In addition to the foregoing, gearing systems for prior art motorcycles having two wheel drives have also required the use of a considerable number of complicated gear components. This has been especially true in connection with providing gearing for driving the steerable front wheel of a motorcycle,, the steerable character of the same making such gearing necessary.

Another serious disadvantage of motorcycles of the prior art has been the ineffective character of front wheel brakes therefor, especially when used in down-hill slopes. It has been impossible, in the prior art, to use a front wheel brake on a motorcycle while traveling down-hill. This has been the case because it has been impossible for a rider to properly apply both front and rear wheel brakes in a manner such as to prevent him from being propelled end over end down the slope.

The above described and other disadvantages of the prior art are overcome, in accordance with the present invention, by providing a chassis, at least a steerable front wheel on the chassis, first power transmission means connecting the motor in driving relation with the rear wheel, and second power transmission means connecting the motor in driving relation with the front wheel, one of the power transmission means including means to disconnect the motor from one of the wheels when the front wheel turns at a speed greater than that of the rear wheel.

In accordance with the present invention, the means to disconnect the motor may be an over-riding clutch. This clutch permits the front motorcycle wheel to roll free when the motorcycle is put into a turn. It is striking to note that, even though the over-riding clutch is actuable immediately upon the front wheel reaching a speed greater than that of the rear wheel, the front wheel drive is in fact engaged almost all the time that the motorcycle is ridden. Although, unobvious, this unusual utility of the over-riding clutch combination, in accordance with the present invention is achieved apparently, because, as has been discovered, and as happens especially when riding a motor cycle on soft or muddy ground, or uphill on loose gravel or ground, a minute slippage of the rear wheel relative to the front wheel effects a continual engagement of the front wheel drive.

Further, in accordance with the present invention, an uncomplicated, yet effective, front wheel drive is provided including a pair of universal joints located over the steering axis of the front wheel. Due to the fact that the front wheel steering axis may be approximately but not exactly vertical, a keyed or splined connection may be provided between the last one of the universal joints and the end of a shaft rotatably connected therewith.

According to another outstanding feature of the present invention, only a single brake is needed for the motorcycle of the present invention. This brake is located only on the front wheel. It is possible to use such a brake in accordance with this invention and still, effectively, have a two wheel brake which may be used on down-hill slopes without toppling a rider. This is true because of the use therewith of the over-riding clutch. Note will be taken that on a down-hill slope, if a front wheel brake is engaged, the over-riding clutch will tend to brake the rear wheel. Due to the fact that the over-riding clutch engages almost immediately, an insignificant rotation of the rear wheel takes place between the time that the front wheel is locked by the brake and the time that the rear wheel is actually braked.

The above described and other advantages of the present invention will be better understood from the following description when considered in connection with the accompanying drawings.

In the drawings which are to be regarded as merely illustrative:

FIG. 1 is a perspective view of a motorcycle constructed in accordance with the present invention;

FIG. 2 is a side elevation of the motorcycle without certain auxiliary equipment;

FIG. 3 is a top plan view of the motor cycle of FIG. 2, portions being broken away to illustrate components of the power and transmission means;

FIG. 4 is a horizontal sectional view taken on line 4—4 of FIG. 2 and illustrating various drive components;

FIG. 5 is a fragmentary transverse sectional view taken on line 5—5 of FIG. 4 of an over-riding clutch;

FIG. 6 is a fragmentary vertical sectional view taken on line 6—6 of FIG. 4;

FIG. 7 is a view of the motorcycle partially in plan and partially in horizontal section showing its position while in a sharp right turn;

FIG. 8 is a diagrammatic view of the motorcycle "climbing" or "walking" into a pickup truck;

FIG. 9 is a diagrammatic view of the motorcycle traveling over snow-covered terrain in which there are fallen trees;

FIG. 10 is a fragmentary sectional view of the lower portion of a tire on the motorcycle in snow or soft ground.

FIG. 11 is a schematic front elevational view of the motorcycle in a position assumed by it when traversing a snow-covered mountain slope;

Figure 12:
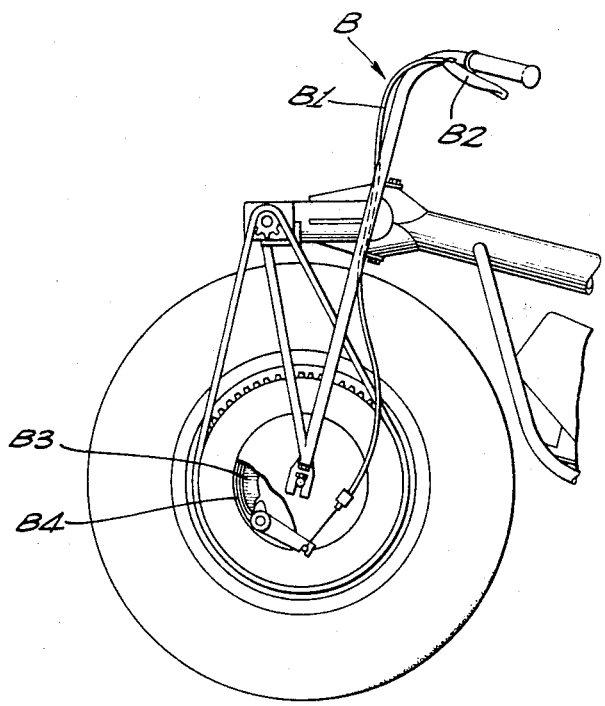
FIG. 12 is a broken away side elevational view of a front portion of the motorcycle.

Referring to the drawings, it will be noted that the present vehicle looks something like a conventional motorcycle. It is emphasized, however, that the construction and operation of the present vehicle are completely different from a conventional motorcycle. Thus, by way of preliminary explanation it is pointed out that the present vehicle has a normal top speed of only 10 or 20 miles per hour, develops full torque while standing still so that it may walk or climb over large logs and into vehicles, and has a two-wheel drive which makes it possible for the vehicle to climb over objects and traverse steep mountain slopes.

As shown in FIG. 1, the vehicle may incorporate auxiliary apparatus such as chain guards, fenders, luggage rack, etc., but these are not shown in the remaining drawings and will not be referred to hereinafter. Furthermore, the vehicle incorporates one or more gas tanks, one of which is shown at 10 in FIG. 1, as well as suitable brake means, to be described.

Referring next to FIGS. 2 and 3, the vehicle comprises a front frame 11, rear or main frame 12, and means 13 to connect the frames together for pivotal steering movement about a generally vertical axis. The front frame has mounted thereon a front gear box 14 which forms part of the drive for front wheel 15. Rear frame 12 has mounted thereon a rear gear box 16 which forms part of the drive for the rear wheel 17 and also for the front wheel. Power and transmission means 18 are supported on the rear frame and are associated with the rear gear box 16 to drive the same. The rear gear box is connected to front gear box 14 by means of a universal-joint drive extending longitudinally through a component 19 of the rear frame.

The front frame 11 comprises a pair of curved handle bar and brace elements 21 which extend downwardly on opposite sides of front wheel 15 and are suitably connected to the axle thereof. The lower ends of elements 21 are rigidly connected to upwardly and forwardly-extending braces 22, the upper ends of the latter being integrally connected to each other and also being rigidly secured to a plate or shelf member 23 disposed above the central portion of wheel 15. Plate 23 is rigidly welded or otherwise secured to the forward end of a generally tubular member 24 which is suitably braced and is welded at its rear end to a cross-plate 26. The ends of the cross-plate 26 are welded to intermediate portions of the handle-bar and brace elements 21. The cross-plate 26 is provided with rearwardly-extending upper and lower flanges 27 adapted to increase the strength of the cross-plate and to receive the pivotal-connector means 13.

The rear frame 11 includes as its main or primary element the longitudinally-extending component 19 previously described. Component 19, which also operates to house a portion of the drive, is indicated as being tubular in shape although it may have various shapes. Connected to the forward portion of tubular component 19 are a pair of downwardly and rearwardly-curving elements 28, the rear ends of which provide support for the axle or rear wheel 17. Brace elements 29 are connected to elements 28 at the axle of wheel 17, and extend upwardly and forwardly for rigid connection to the rear gear box 16 and integral connection to each other. Other braces 31 are rigidly connected between the forward ends of elements 29 and intermediate portions of elements 28. Transverse braces are connected between the elements 28 to make the construction more rigid and to provide shielding and support for the power and transmission means 18. A suitable seat or saddle 32 is suitably mounted on longitudinally component 19 above the rear end portion thereof.

Referring particularly to FIG. 6, the means 13 for pivotally connecting the frames 11 and 12 to each other comprise upper and lower pivot pins or screws having journal portions 33 which are rotatably mounted in suitable bearings 34 provided in the flanges 27 on cross-plate 26. The ends 35 of the screws are threaded into nut portions 36 which are rigidly connected to the forward end of rear frame component 19 by suitable welds and by brace means 37. The front frame 11 may thus be turned sharply relative to the rear or main frame 12, about a generally vertical although somewhat rearwardly-inclined axis. It is a feature of the invention that removal of the pivot pins 13 permits the entire front frame and connected wheel 15 to be disassembled from the rear or main frame.

The front gear box 14 comprises a generally L-shaped housing 38 which is supported on the shelf 23 and has a leg extending into the tubular frame member 24 as shown in FIG. 4. A first shaft 39 is journalled in such housing portion, by means of a double-roller thrust bearing 41, and has a bevel gear 42 mounted on its forward end. Gear 42 meshes with a second bevel gear 43, in right-angle relationship, such second gear being non-rotatably mounted on a second shaft 44. The shaft 44 is journalled in housing 38 by means of two roller thrust bearings 46, and has an end portion which extends outwardly from the housing and above one side of the front wheel 15. Suitable means are provided to prevent leakage of lubricant from the housing 38 so that the bevel gears and the associated roller bearings may be bathed in lubricant.

A sprocket 49 is non-rotatably mounted on the projecting end of shaft 44, being connected through a chain 53 to a much larger sprocket 54 on the hub portion of wheel 15 as indicated in FIG. 2. Since the hub portion of the wheel 15 is suitably journalled on an axle which extends between the lower ends of the front frame elements, and since the large sprocket 54 is fixedly mounted coaxially on such hub, it follows that rotation of the sprocket 49 will effect driving of the front wheel.

The rear gear box 16 comprises a generally T-shaped housing 56 the stem of which extends into the rear end of the main longitudinal frame component 19. A shaft 57 is journalled in such stem by means of a double-roller thrust bearing 58, and has a bevel gear 59 fixedly mounted at its rear end. Similarly to the case of the front gear box 14, bevel gear 59 meshes with a second bevel gear 61 on a shaft 62 which is journalled in the housing by means of two roller thrust bearings 63. The shaft 62 extends transversely of the vehicle and projects from both ends of the cross-arm portion of housing 56. Suitable sealing means, indicated at 64, are provided to prevent leakage of lubricant from the housing.

The end of shaft 62 which is on the opposite side of the vehicle from the projecting end of shaft 44 has mounted thereon a sprocket 66 corresponding to the sprocket 49 on shaft 44. Sprocket 66 connects through a chain 67 with a large sprocket, the latter being mounted on the hub of rear wheel 17 and on the opposite side of the vehicle from the corresponding sprocket 54 for the front wheel. The sprockets 49 and 66 have the same relationships to their connected larger sprockets, so that the forward and rear wheels are driven forwardly at the same speeds.

In order to permit the front wheel to turn faster than the rear wheel when the vehicle is turning a corner, the shaft 57 is divided into two axially-aligned components, and an over-riding clutch means is interposed therein. More specifically, a clutch housing 47 is keyed on the left component of shaft 57, and has a portion which is journalled on the other or right component of shaft 75 as by a roller bearing. A notched element 48 is keyed on such right component, radially inwardly of the housing 47, and has sprag rollers 52 mounted therein for selective engagement with the housing. The walls of the notches are so oriented that the rollers 52 wedge against the housing 47 when the right shaft component 57 is being driven counterclockwise as viewed in FIG. 5, the drive then being completed to the left shaft component and thus to the front wheel. When the front wheel turns faster than the rear wheel, the rollers present no resistance to advancing movement of housing 47 relative to element 48.

It is a feature of the invention that flexible drive means are mounted longitudinally in frame component 19 to connect shaft 39 and 57 in such manner that a sharp corner may be turned by the vehicle. Such flexible drive means is best illustrated in FIGS. 4, 6, and 7 as comprising a double universal joint 68 which is centered between the pivotal connector means 13 described heretofore.

Joint 68 comprises a first socket member 69 which is non-rotatably mounted on the forward end of shaft 57 by longitudinal splines indicated at 71, it being understood that the shaft 57 is suitably journalled in frame component 19 not only by means of the previously-indicated bearings 58 but by additional roller bearing means 72. A second socket member 73 is connected to the rear end of shaft 39 by a suitable key. The socket members 69 and 73 have mounted therein the spherical ends of a connector 6, such spherical ends being connected to the sockets by means of pins 77 disposed in planes which are at right angles to each other. The pins 77 move in slots 78 which lie in such right-angel planes, and extend through bearing pins 79 which are rotatably mounted in the spherical connector ends at right angles to each other and to the planes of the associated slots 78.

As previously indicated, the center portion of connector 76 is disposed directly between the pivot pins 13 when the vehicle is being driven straight ahead as indicated in FIG. 4. Upon turning of the forward frame relative to the rear frame, as indicated in FIG. 7, the center portion of connector 76 moves to the corresponding side of a line between the pivot pins 13. When the front frame is disassembled from the rear frame by removing the pivot pins 13, the universal joint merely slides off the front end of shaft 57.

Proceeding next to a description of the power and transmission means 18, and referring especially to FIGS. 2 and 3, this comprises a motor 81, illustrated as a gasoline engine, mounted on the rear frame between brace elements 28. The output pulley of motor 81 is indicated at 82 and connects through a belt 83 to the input of a power coupling 84. The power coupling 84 is a fluid drive making use of a hydraulic fluid and two opposed impellers or fans, not shown, the construction being such that the torque remains the same whether the driven wheel 15 or 17 is stopped or moving, so long as the engine is operating in a certain speed range. When the vehicle is restrained by an obstacle the engine output torque transmitted to the wheels may be gradually increased, by utilizing the slippage inherent in the fluid coupling at low speeds, until the vehicle climbs over the obstacle. Thus, precise control of power is possible even by an inexperienced operator. A suitable fluid coupling is shown and described in Lysholm Patent No. 2,357,338, issued September 5, 1944, for a Hydraulic Coupling.

The output of the fluid drive 84 is connected to a gear-reducer or transmission 86 which preferably has two speed ranges, shifting between the ranges being effected by means of a suitable control indicated generally at 87 in FIGS. 1 and 2. The output of the transmission 86 is transmitted through sprockets 88 and 89 and a chain 90 to the shaft 62 described with relation to FIG. 4. Power is thus transmitted from the engine to the previously-described drive for both wheels of the vehicle.

The power coupling 84, and the various gear relationships, are such that the vehicle wheels have great torque but rotate at very low speeds. Thus, the top speed of the vehicle is approximately 10 to 20 miles per hour. However, the vehicle has sufficient power that it may climb into a pickup truck, for example, as indicated in FIG. 8.

The tire portions of the front and rear wheels 15 and 17 are large, soft and light in weight. Referring to FIG. 10, the tire portions are very thin, being preferably two-ply. The tires are adapted to be inflated to only a very low pressure, such as a few p.s.i. gauge, so that there is substantial flexing thereof as the vehicle progresses. For example, the pressure may be 1.5 p.s.i. gauge. Such under-inflation of the tires not only increases the surface area effective to prevent sinking of the vehicle in snow or soft ground, but also increases traction to a high degree.

The ratio of wheel clearance to ground clearance is not greater than about two. The "wheel clearance" is hereby defined as the distance between adjacent portions of the treads of the two tires when the vehicle is traveling straight ahead along a line which intersects the axes of both wheels. The "ground clearance" is hereby defined as the vertical distance between a level supporting surface and the lowermost parts of those portions of frame elements 28 which lie between the wheels.

The wheel base of the disclosed vehicle may be forty to fifty inches, for example forty-seven inches. The outer diameter of each tire may be between twenty and thirty inches, for example twenty-eight inches. The ground clearance beneath the lowermost parts of the frame elements 28 may be greater than ten inches, for example fifteen inches or more.

The skid or runner elements have no substantial projecting portions such as may catch on obstacles, any footrests or other appendages on components 28 being fully retractable.

Figure 13:
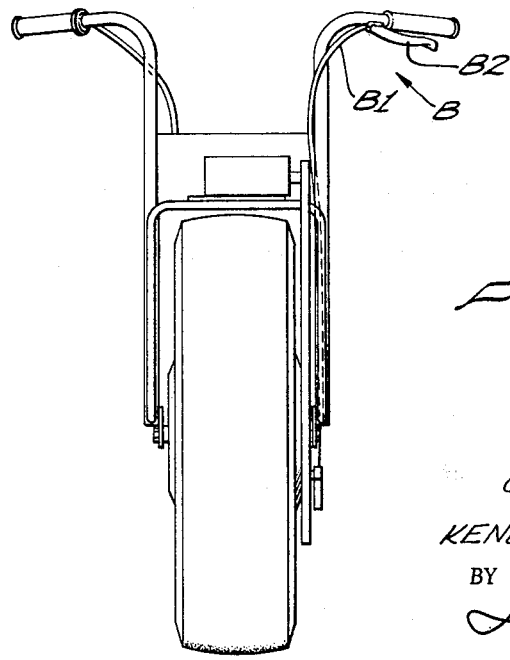
FIG. 13 is a front elevational view thereof.

In FIGS. 12 and 13 the structure therein may be identical with the structure shown in FIGS. 1 to 11, inclusive. However, some detail of a brake is indicated at B including a brake cable B1, a brake cable operator lever B2, a brake shoe B3 and a brake drum B4 fixed to the front wheel of the motorcycle. Brake B may be entirely conventional.

From the foregoing, it will be appreciated that the overriding clutch permits the front wheel to rotate at a rate greater than that of the rear wheel when the motorcycle of the present invention is put into a turn. The overriding clutch, however, is effective to drive the front wheel a great deal of the time due to the fact that in soft ground, a minute rear wheel slippage relative to front wheel rotation is required to engage the clutch. Also in accordance with the present invention, the use of the double universal joint 68 provides means by which the front wheel drive is made effective even though the front wheel is steerable. The joint 68 also is slidable on at least one of the two shafts on which it is mounted. This provides a simple means by which a drive for a steerable front wheel may be made effective.

Further, the brake B of the present invention, by being located on the motorcycle front wheel and by being employed with an over-riding clutch, makes it possible to brake the motorcycle in a manner as effective as the same would be possible with the use of both front and rear wheel brakes. Further, the single brake B is in fact more effective than two separately actuable front and rear wheel brakes in that on down-hill slopes, it is not necessary to synchronize their operation, the same being effectively, automatically synchronized. As stated previously, the minutely small slippage or rolling character of the rear wheel relative to the front wheel causes the over-riding clutch to engage almost instantaneously. Further, in a similar regard, and although it is unobvious, it is an unusually useful characteristic of the operation of the over-riding clutch that the same is engaged a considerable length of time during the operation of the motorcycle on steep up-hill slopes and in soft material.

Although only one specific embodiment of the present invention has been described and illustrated herein, many changes and modifications will of course suggest themselves to those skilled in the art. This single embodiment has been selected from this disclosure for the purpose of illustration only. The present invention should therefore not be limited to the embodiment so selected, the true scope of the invention being defined only in the appended claims.

I claim:

1. A one-passenger motor vehicle for overland travel in mountainous areas, which comprises a rear frame having an upper generally-horizontal hollow longitudinal component, frame means connected to said upper component to support a power unit immediately therebeneath and to rotatably mount a rear wheel at the rear thereof, a seat mounted above the rear portion of said upper component, a front frame including handle bar elements extending downwardly for pivotal support of a front wheel, a hollow front frame component connected to said handle bar elements and extending forwardly in general alignment with said upper component of said rear frame, pivot means to pivotally connect said front frame to said rear frame between said hollow components thereof to thereby permit steering movement of said front frame relative to said rear frame, front and rear wheels rotatably mounted on said frames and incorporating large-size light-weight tires, front gear means mounted at the forward end of the hollow component of said front frame and incorporating right-angle bevel gears, chain drive means connecting said front gear means to a large sprocket on said front wheel, rear gear means mounted at the rear end of said upper component of said rear frame and incorporating right-angle bevel gears, front and rear shafts respectively connected to said front and rear gear means and extending through the hollow components of said front and rear frames, a universal joint connecting said shafts at said pivot means, an engine mounted on said rear frame beneath said upper component thereof, a fluid drive mounted on said rear frame beneath said upper component and driven by said engine, means to connect said fluid drive to said rear gear means, means to connect said rear gear means to said rear wheel and including a chain and a sprocket mounted on said rear wheel, and over-riding clutch means interposed in the drive from said motor to said front wheel to permit rotation of said front wheel at a greater speed than said rear wheel when the vehicle is turning a corner.

2. The invention as claimed in claim 1, in which the various gear ratios are so selected that said vehicle has a low top speed but is capable of developing very high torques in the wheels due to the presence of said fluid drive.

References Cited by the Examiner
UNITED STATES PATENTS

| | | | |
|---|---|---|---|
| 1,107,990 | 8/1914 | Pamer | 180—31 X |
| 1,139,622 | 5/1915 | Yordi | 180—31 |
| 1,351,084 | 8/1920 | Winther | 180—44 |
| 2,435,021 | 1/1948 | Seider | 180—26 |
| 2,445,058 | 7/1948 | Fields | 180—33 X |
| 2,959,237 | 11/1960 | Hill | 180—44 |
| 3,045,772 | 7/1962 | Nicolai | 180—31 |

FOREIGN PATENTS

| | | |
|---|---|---|
| 1,162,201 | 4/1958 | France. |
| 360,735 | 11/1931 | Great Britain. |
| 93,601 | 12/1938 | Sweden. |

OTHER REFERENCES

Equipment Development Report No. 46 of Forest Service, May 1957, pages 5 and 6.

KENNETH H. BETTS, *Primary Examiner.*

A. HARRY LEVY, BENJAMIN HERSH, *Examiners.*